United States Patent
Mamiya et al.

[11] Patent Number: 6,079,387
[45] Date of Patent: Jun. 27, 2000

[54] AIR INTAKE CONTROL SYSTEM FOR ENGINE EQUIPPED WITH EXHAUST GAS RECIRCULATION FEATURE

[75] Inventors: Kiyotaka Mamiya; Michihiro Imada; Takeo Yamauchi; Masayuki Tetsuno, all of Hiroshima, Japan

[73] Assignee: Mazda Motor Corporation, Hiroshima, Japan

[21] Appl. No.: 09/120,242

[22] Filed: Jul. 22, 1998

[30] Foreign Application Priority Data

Jul. 23, 1997 [JP] Japan .................................. 9-197310

[51] Int. Cl.7 .............................. F02B 17/00; F02D 11/10; F02M 25/07
[52] U.S. Cl. ...................... 123/295; 123/399; 123/568.26
[58] Field of Search ..................... 123/295, 305, 123/399, 568.21, 568.22, 568.26

[56] References Cited

U.S. PATENT DOCUMENTS

| | | | |
|---|---|---|---|
| 4,279,235 | 7/1981 | Flaig et al. | 123/568.21 |
| 4,524,745 | 6/1985 | Tominari et al. | 123/399 |
| 4,763,264 | 8/1988 | Okuno et al. | 123/399 |
| 5,150,680 | 9/1992 | Nishimura | 123/399 |
| 5,735,244 | 4/1998 | Machida et al. | 123/399 |
| 5,758,621 | 6/1998 | Suzuki et al. | 123/399 |
| 5,826,559 | 10/1998 | Ichimoto et al. | 123/295 |
| 5,848,580 | 12/1998 | Mashiki | 123/295 |

FOREIGN PATENT DOCUMENTS

63-50544  10/1988  Japan .

*Primary Examiner*—Willis R. Wolfe
*Attorney, Agent, or Firm*—Sixbey, Friedman, Leedom & Ferguson, PC; Donald R. Studebaker

[57] ABSTRACT

An air intake control system for an engine equipped with an exhaust gas recirculation feature controls an exhaust gas recirculation valve according to an amount of air charge dictated by an amount of intake air detected by an air flow sensor to deliver a target amount of air charge and control an amount of air charge meeting an estimated amount of air charge estimated under the condition that the control of exhaust gas recirculation valve according to an amount of air charge is interrupted.

8 Claims, 5 Drawing Sheets

FIG. 5F

AIR INTAKE CONTROL SYSTEM FOR ENGINE EQUIPPED WITH EXHAUST GAS RECIRCULATION FEATURE

BACKGROUND OF THE INVENTION

1. Field of the Invention

The invention relates to an air intake control system for an engine equipped with an exhaust gas recirculation system which controls the amount of exhaust gas that is recirculated on the basis of a comparison of an air charging ratio with a target charging ratio.

2. Description of the Related Art

In order to lower nitrogen oxide (NOx) emissions in the exhaust gas from an engine, it is typical to equip an exhaust gas recirculation system which has exhaust gas recirculation adjusting means and control means for determining a target amount of fresh air charge according to an operated position of an accelerator and an air charging ratio dictated by pressure in an intake air passage and a temperature of intake air and controlling the exhaust gas recirculation adjusting means to remove a difference between a practical amount of fresh air charge detected by an air flow sensor and a target amount of fresh air charge. Such a control system is known from, for example, Japanese Patent Publication No.63-50544. This control system can be applied to gasoline engines as well as to diesel engines. In a fuel direct injection type of gasoline engine adapted to make fuel injection in a compression stroke to form uneven distribution of an airfuel mixture around a spark plug so as thereby to cause stratified charge combustion, it is potentially performed to recirculate a large amount of exhaust gas into the engine while stratified charge combustion occurs. In this case, the prior art control system to adjust amounts of fresh air charge and exhaust gas recirculation is effective.

However, the prior art control system is accompanied by aggravation of controllability of the amount of exhaust gas admitted to the engine in the event of, for example, an occurrence of a change in intake air density due to changes in atmospheric pressure and/or temperature. A reduction in intake air density caused due to a change in atmospheric pressure and temperature is accompanied by a reduction in mass of intake air if an engine operating condition and/or recirculation of exhaust gas remain unchanged. In the case where the control of exhaust gas recirculation is performed on the basis of a comparison between a practical amount of fresh air charge and a target amount of fresh air charge, if a correction is made by tempering an amount of fresh air charge with intake air density, the exhaust gas recirculation adjusting means can be controlled to make up a downward tendency of intake air due to a decline in intake air density, which is however accompanied by a reduction in exhaust gas that is recirculated. On the other hand, a rise in intake air density is accompanied by an increase in exhaust gas that is recirculated. In view of the above, therefore, there is aggravation of the control of NOx emissions and the stability of combustion.

SUMMARY OF THE INVENTION

It is an objective of the invention to provide an air intake control system for an automobile engine which appropriately controls both amounts of fresh intake air and exhaust gas admitted to the engine even upon an occurrence of a change in intake air density and desirably controls NOx emissions.

The foregoing object of the present invention is achieved by providing an air intake control system for an engine equipped with an exhaust gas recirculation system for performing control of exhaust gas regulating means in which an amount of exhaust gas admitted to the engine is regulated to bring a practical amount of air charge to the engine dictated by an air flow rate to a target amount of air charge determined according to engine operating conditions. The air intake control system includes variable air intake means, such as an electrically actuated throttle valve, disposed in an intake air passage and driven to variably control a practical amount of air charge to the engine and control means for estimating an amount of air charge to the engine on the basis of a driven amount of the variable air intake means on a condition that the control of exhaust gas regulating means is assumed to be interrupted, and performing control of the variable air intake means to bring the estimated amount of air charge to the target amount of air charge.

With the air intake control system, even in the event where intake there occurs a downward tendency of intake air due to a decline in intake air density due to changes in atmospheric pressure and/or temperature, the variable air intake means is controlled to appropriately regulate the practical amount of intake air without an effect of affecting the control of exhaust gas recirculation through the exhaust gas regulating means, as a result of which, an appropriate amount of exhaust gas is admitted to the engine.

The control of a practical amount of air charge by the variable air intake means may performed while the exhaust gas recirculation system controls the exhaust gas regulating means. The air intake control system determines a basic throttle valve opening for the electrically actuated throttle valve according to engine operating conditions and corrects a practical throttle valve opening on the basis of the basic throttle valve opening and a difference between the estimated amount of air charge and the target amount of air charge. In this way, in the event of an occurrence of a downward or upward tendency of intake air due to a decline in intake air density, an opening of the throttle valve is corrected to adjust a practical amount of air charge.

The amount of air charge may be estimated on the basis of an engine speed and a throttle valve opening correctively tempered with intake air density according to a temperature of intake air and the atmospheric pressure, which is always desirable for the variable air intake means, i.e. the electrically actuated throttle valve, to perform more precise regulation of a practical amount of air charge in spite of a change in intake air density.

The basic throttle valve opening and an controlled amount of the exhaust gas regulating means may be determined so that pressure in the intake air passage downstream from the electrically actuated throttle valve is made approximately equal to the atmospheric pressure in an extent of basic throttle openings less than its full position in an engine operating zone in which the control of exhaust gas regulating means and the control of the variable air intake means are performed. In this instance, the basic throttle valve opening is always less than the full position even when the practical amount of air charge is increased, the throttle valve is appropriately controlled to increasingly change its opening according to a decline in intake air density if intake air density declines.

It is desirable to change a throttle valve opening to a full position only when intake air density is low in an engine operating zone in which the control of exhaust gas regulating means and the control of the variable air intake means are performed and the basic throttle valve opening is changed larger. This makes the throttle valve open to its full position in the state of lower intake air density and causes it to decrease its opening with a rise in intake air density. In this way, the throttle valve changes its opening according to changes in intake air density.

The engine may be of a fuel direct injection type having a fuel injector which is controlled to inject fuel in a compression stroke to cause stratified charge combustion in a specified engine operating zone. In this type of engine, it is desirable to perform the control of exhaust gas recirculation through the exhaust gas regulating means and the control of intake air through the variable air intake means in at least the specified engine operating zone. In this instance, in the engine operating zone for stratified charge combustion, an air-fuel mixture is made lean and exhaust gas is recirculated with an effect of lowering NOx emissions and improving fuel efficiency.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
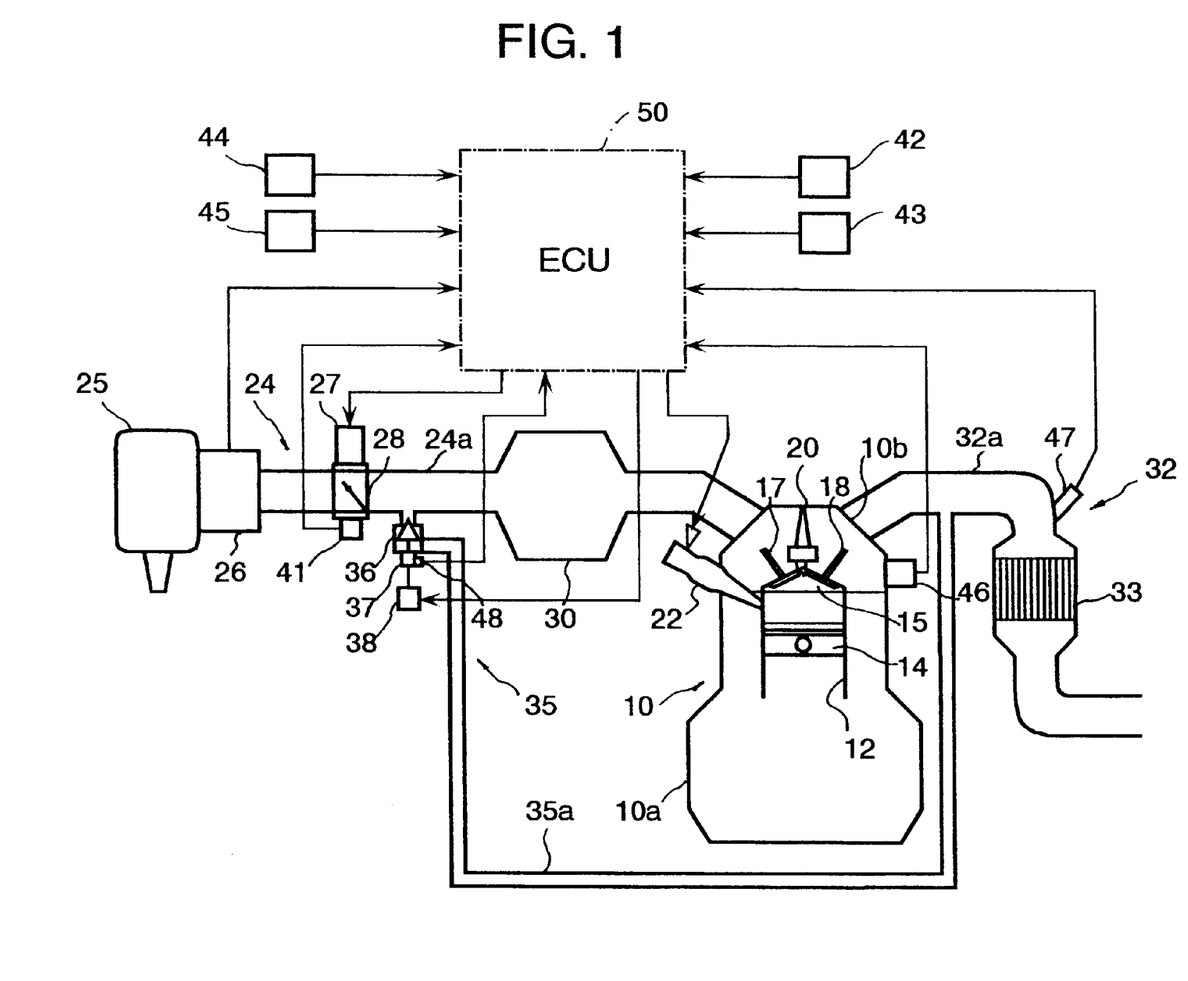
FIG. 1 is a schematic illustration showing the overall structure of an engine equipped with an air intake control system in accordance with an embodiment of the invention.

Referring to the drawings in detail and, in particular, to FIG. 1 schematically showing a multi-cylinder direct fuel injection engine 10 equipped with an exhaust gas recirculation system which is controlled an air intake control system in accordance with an embodiment of the invention, the engine 10 is comprised of a cylinder block 1a provided with cylinder bores 12 in which pistons 14 slide and a cylinder head 1b. A combustion chamber 15 is formed in each cylinder by the top of the piston 14, a lower wall of the cylinder head 1b and the cylinder bore 12. An intake port and an exhaust port open into the combustion chamber 15 and are opened and shut at a predetermined timing by an intake valve 17 and an exhaust valve 18, respectively. A spark plug 20 is installed in the cylinder head 1b to with its electrode tip placed down into the combustion chamber 15. A fuel injector 22 projects into the combustion chamber 15 from the side and splays fuel directly into the combustion chamber 15.

Air is introduced into the engine 1 through an intake line 24 including an intake passage 24a which is provided with an air cleaner 25, an air flow sensor 26, throttle valve 28 driven by an electric motor 27 and a surge tank 30 arranged in order from the upstream end. Exhaust gas is discharged into an exhaust line 32 including an exhaust passage 32a from the engine 1. The exhaust line 32 has a catalytic converter 33 disposed in the exhaust passage 32a. An exhaust gas recirculation system 35 is installed between the intake line 24 and the exhaust line 32 to admit an controlled amount of exhaust gas into the intake air stream. The exhaust gas recirculation system 35 incorporates an exhaust gas recirculation valve, such as a vacuum modulated exhaust gas recirculation valve (which is hereafter referred to as an EGR valve) 36, disposed in an exhaust gas recirculation passage 35a connected between the intake passage 24a and the exhaust passage 32a. The EGR valve 36 is actuated by a vacuum actuator 37 cooperating with a vacuum regulator 38 which is comprised of, for example, a pair of duty solenoid valves such as a vacuum induction duty solenoid valve and an atmosphere induction solenoid valve that regulate proportions of a vacuum and the atmosphere, respectively.

The engine 1 is further provided with various sensors, namely a throttle sensor 41 for detecting a point of throttle opening, a speed sensor 42 for detecting an engine speed, an accelerator position sensor 43 for detecting a position of an accelerator (not shown), temperature sensors 44 and 46 for detecting temperatures of intake air and engine cooling water, respectively, a pressure sensor 45 for detecting the atmospheric pressure, an oxygen ($O_2$) sensor 47 for detecting the oxygen concentration of exhaust gas by which an air-fuel ratio is dictated, and a valve position sensor 48 for detecting a point of EGR valve opening. Output signals from these sensors 42–48 are directed to an engine control unit (ECU) 50 comprised of, for example, a programmed microprocessor and stores various control maps. The engine control unit 50 controls the fuel injector 22, the throttle valve 28 and the EGR valve 36. Specifically, the engine control unit 50 provides control signals, such as a fuel injection control signal with which the fuel injector 22 is actuated to inject a controlled amount of fuel at a controlled timing, a throttle control signal with which the electric motor 27 actuates the throttle valve 28 to open to a controlled point of valve opening and a recirculation control signal with which the vacuum regulator 38 is caused to operate the vacuum actuator 37 so as thereby to control the EGR valve 36 to admit a controlled amount of exhaust gas that is recirculated.

Figure 2:
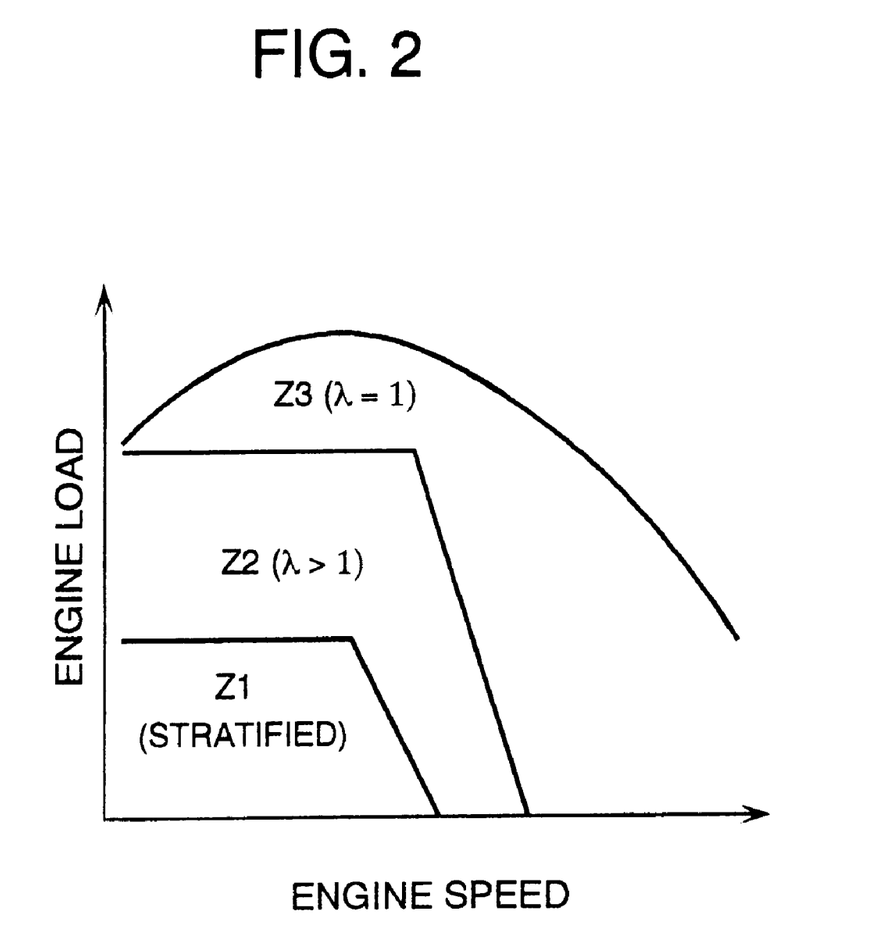
FIG. 2 is a diagrammatic illustration showing engine operating zones for various combustion modes and air-fuel ratios.

FIG. 2 illustrates engine operating zones for various combustion modes and air-fuel ratios for the direct fuel injection engine. As shown, there are three engine operating zones, namely a stratified charge combustion zone Z1 for lower engine speeds and loading and a homogeneous charge combustion zone for higher engine speeds and loading which is subdivided into two zones, namely a lean homogeneous charge combustion zone Z1 for moderate engine speeds and loading and a stoichiometric homogeneous charge combustion zone Z2 for higher engine speeds and loading. In the stratified charge combustion zone Z1, fuel is sprayed in a later stage of a compression stroke with an effect of uneven distribution of a stratified air-fuel mixture around the spark plug 20, as a result of which stratified charge combustion is made. In this instance, the throttle valve 28 provides a large throttle opening to admit a large amount of intake air to the engine 1 to make an overall air-fuel mixture significantly lean at, for example, an air-fuel ratio of approximately 40. In the lean and stoichiometric homogeneous charge combustion zones Z1 and Z2, fuel is sprayed in an early stage of a suction stroke with an effect of homogeneous distribution of an air-fuel mixture in the whole combustion chamber 15. An air-fuel mixture is made leaner (which is otherwise specified by an air excess ratio $\lambda$ greater than 1) than a stoichiometric air-fuel mixture ($\lambda=1$) in the lean charge combustion zone Z2, and is maintained stoichiometric in the stoichiometric charge combustion zone Z3.

Figure 3:
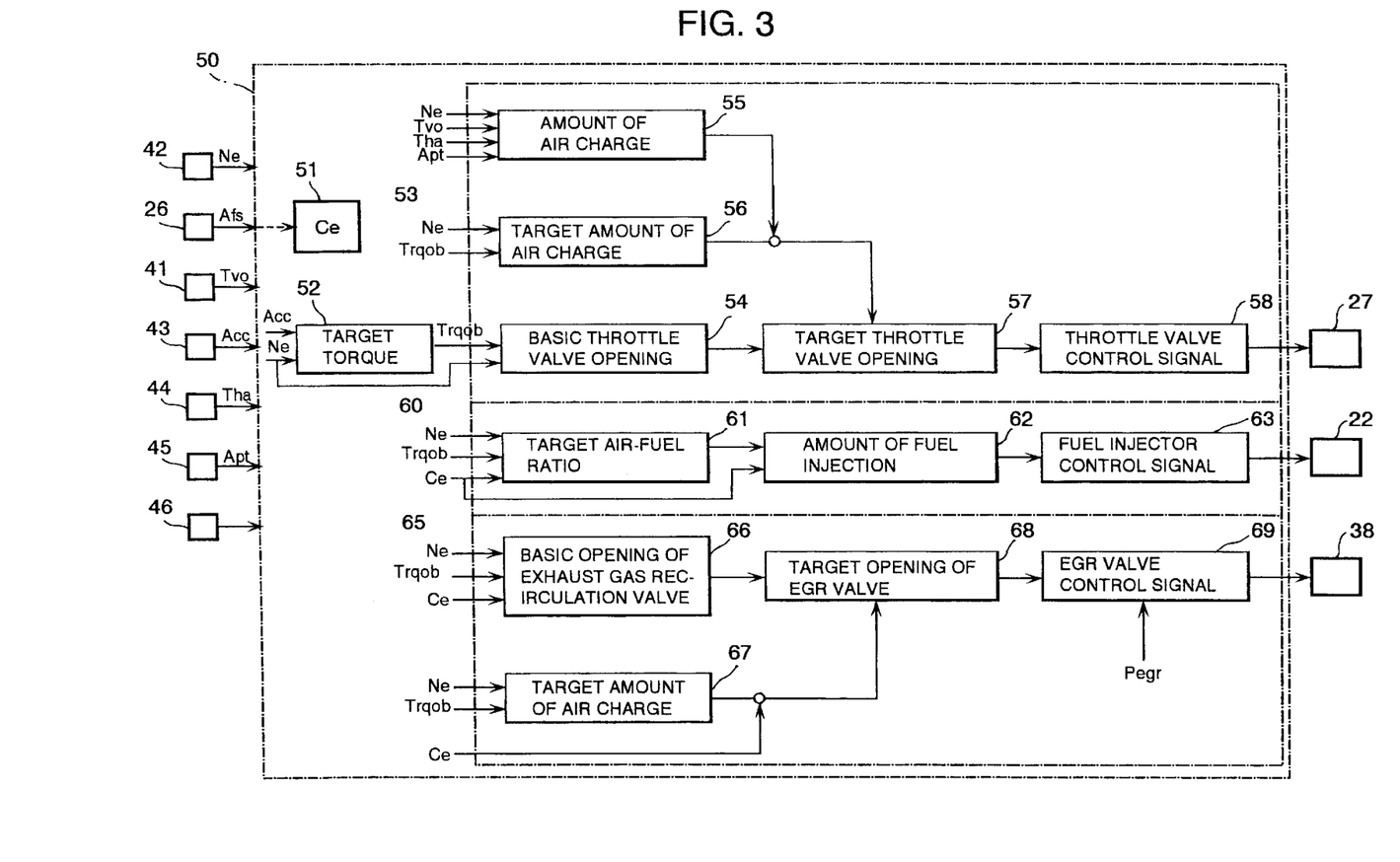
FIG. 3 is a functional block diagram showing an engine control unit.

FIG. 3 is a functional block diagram showing the engine control system 50.

As shown, the engine control system 50 determines target engine output torque Trqob based on an accelerator position Acc detected by the accelerator position sensor 43 and an engine speed Ne detected by the speed sensor 42 and an amount of intake air introduced into the engine 1 at function block 52. The determination is made by use of a target torque control map which specifies target engine torque relative to engine speeds and throttle openings. Further, the engine control system 50 determines an amount of air charge Ce based on an amount of intake air Afs introduced into the engine 1 which is dictated by an output signal from the air flow sensor 26 at function block 51.

The engine control system 50 is subdivided into three sections, namely an air charging control section 53, a fuel injection control section 60 and an exhaust gas recirculation control section 65. The air charging control section 53 is comprised of blocks 54–57 for determining a basic throttle valve opening Tvob, an amount of air charge Ceco which is used for a correction of throttle opening Tvob, an amount of air charge Ceob and a practical throttle valve opening, a target 58 for providing a throttle valve control signal STvo. At the block 54 a basic throttle valve opening Tvob is determined according to an engine operating condition. In the stratified charge combustion zone Z1 and in the lean homogeneous charge combustion zone Z2, basic throttle opening control maps which specify basic throttle openings Tvob relative to engine speeds Ne and target engine output torque Trqob are used. In the stoichiometric homogeneous charge combustion zone Z3 a basic throttle opening Tvob is determined to be proportional to an accelerator position Acc. In the stratified charge combustion zone Z1, while the basic throttle valve opening Tvob is determined to be large sufficiently to make an air-fuel mixture significantly lean, it is fixed at a position, which is less than its full position and in which the pressure of air stream in the intake passage 24a near the engine 1 is approximately equal to or desirably slightly higher than the atmospheric pressure, in spite of changes in engine loading during execution of the exhaust gas recirculation control. However, the basic throttle valve opening Tvob may be increased correspondingly to an increase in the amount of exhaust gas recirculation in an engine operating zone in which the basic EGR valve opening (which will be described later) Pegrb. At block 55, the air charging control section 53 determines an amount of air charge Ceest estimated under the condition that it is granted that no exhaust gas is admitted to the engine 1. The estimation of the amount of air charge Ceest (off-EGR air charge) is made by tempering volumetric efficiency dictated by a current engine speed Ne and a current throttle valve opening Tvo with a corrected intake air density depending upon a temperature of intake air Tha and the atmospheric pressure Atp. Volumetric efficiency are specified in a map relative to engine speed Ne and throttle valve opening Tvo. At block 56, the air charging control section 53 finds a target amount of air charge Ceob for conditions in which no exhaust gas is admitted to the engine 1. Target amounts of air charge Ceob are specified relative to engine speeds Ne and target engine output torque Trqob in a map. The map specifies amounts of air charge relative to engine speeds and engine output torque which are measured varying throttle valve opening in certain circumstances under interruption of exhaust gas recirculation by a bench test. Further, the air charging control section 53 determines a target throttle valve opening Tvoob based on the basic throttle valve opening Tvob and a beedback correction amount of air charge Ctfb meeting a difference between the target amount of air charge Ceob and the estimated amount of air charge Ceest at block 57, and provides for a control signal for driving the electric motor 27 to open the throttle valve 28 to the target throttle valve opening Tvoob at block 58.

The fuel injection control section 60 determines a target air-fuel ratio meeting current engine operating conditions at block 61. In this instance, a map for the stratified charge combustion zone Z1 specifies target air-fuel ratios A/Fob relative to engine speeds Ne and target engine output torque Trqob, and a map for the lean homogeneous charge combustion zone Z2 specifies target air-fuel ratios A/Fob relative to engine speeds Ne and amounts of air charges Ce. However, a target air-fuel ratio A/Fob is fixed at 14.7 for the stoichiometric homogeneous charge combustion zone Z3.

The exhaust gas recirculation control section 65 determines a basic EGR valve opening Pegrb of the EGR valve 36 according to engine operating conditions and a target amount of air charge Ceob during execution of the exhaust gas recirculation control (on-EGR air charge) according to engine operating conditions at blocks 66 and 67, respectively. A map for the stratified charge combustion zone Z1 specifies basic EGR valve openings Pegrb relative to engine speeds Ne and target engine output torque Trqob, and a map for the stoichiometric homogeneous charge combustion zone Z3 specifies basic EGR valve openings Pegrb relative to engine speeds Ne and amounts of air charge Ce. However, the EGR valve 36 is left to remain closed in the lean homogeneous charge combustion zone Z2 because if exhaust gas is recirculated in the lean homogeneous charge combustion zone Z2, there occurs easy aggravation of stable combustibility. Similarly, maps for each of the stratified and stoichiometric homogeneous charge combustion zones Z1 and Z3 specifies target amounts of air charge Ceob relative to engine speeds Ne and target engine output torque Trqob. Further, a target EGR valve opening Pegrob is determined based on the basic EGR valve opening Pegrb and a feedback correction EGR valve opening Pegrfb meeting a difference between the target amount of air charge Ceob and the amount of air charge Ce dictated by an amount of intake air Afs detected by the air flow sensor 26 at block 68, and a control signal for driving the vacuum regulator 38 is provided to regulate a vacuum for the actuator 37 so that the EGR valve 36 attains the target EGR valve opening Pegrob at block 69.

Figure 4:
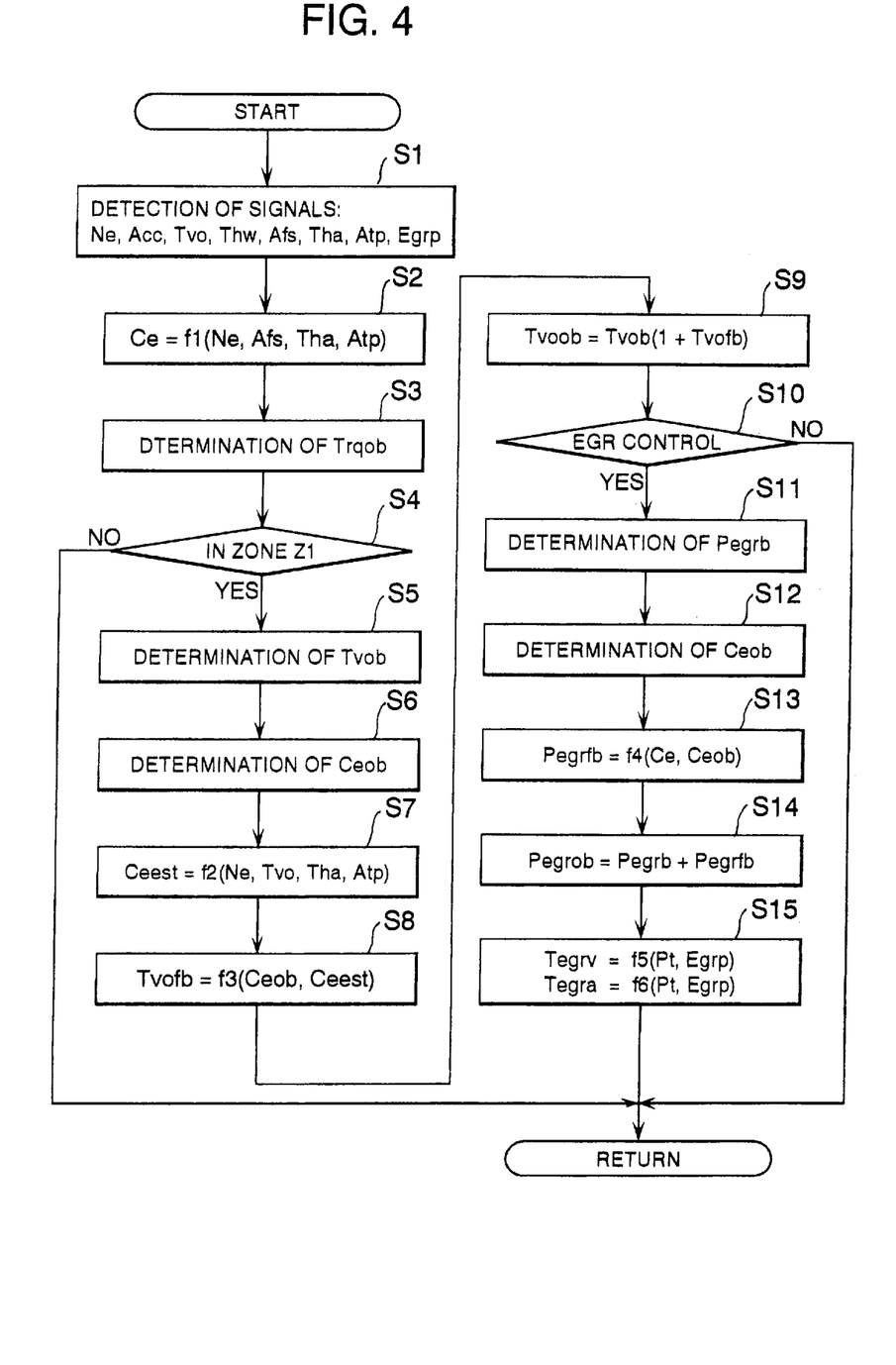
FIG. 4 is a flow chart illustrating a sequence routine of the exhaust gas recirculation control.
Figure 5A:
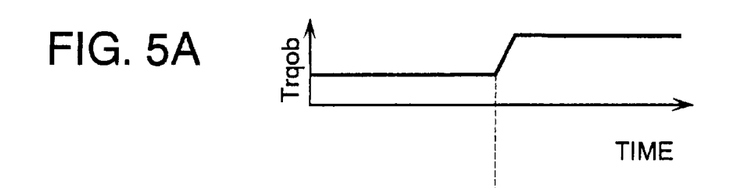
FIGS. 5A, 5B, 5C, 5D, 5E, and 5F constitute a time chart showing changes in various controlled variables.
Figure 5B:
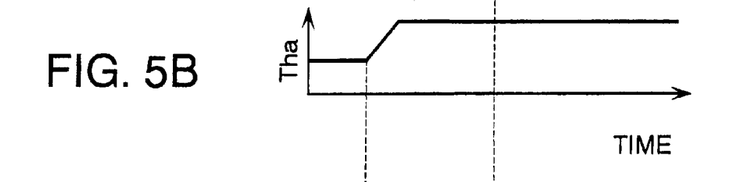
Figure 5C:
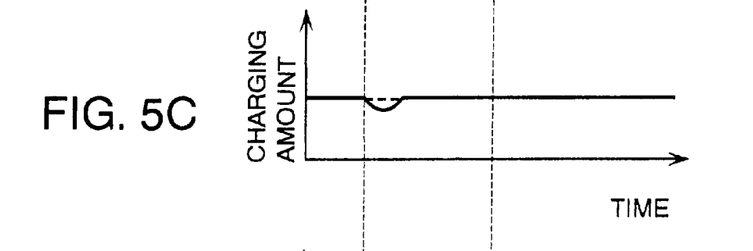
Figure 5D:
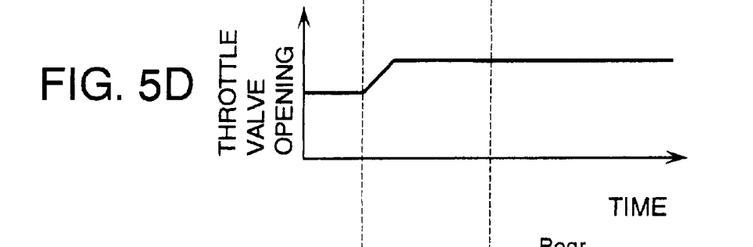
Figure 5E:
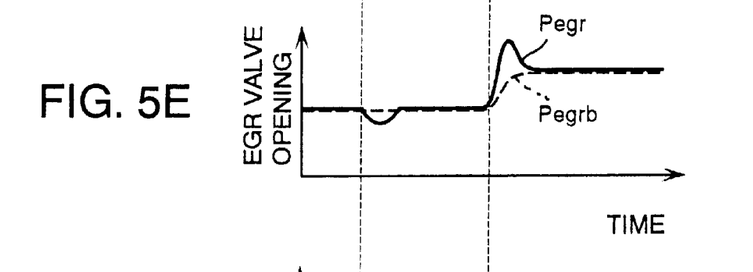
Figure 5F:
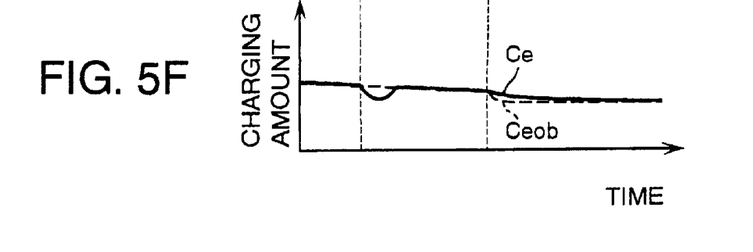

FIG. 4 shows a flow chart illustrating a sequence routine of the control of the engine 1 during execution of the exhaust gas recirculation control in the stratified charge combustion zone Z1. Control that is executed in the lean homogeneous charge combustion zone Z2 or in the stoichiometric homogeneous charge combustion zone Z3 or under engine operating conditions that require no exhaust gas recirculation is omitted from the flow chart. As shown, when the flow chart logic commences and control proceeds directly to step S1 where various control parameters are detected. Subsequently, after determining a current amount of air charge Ce by calculating a function f1 of an engine speed Ne and an amount of intake air Afs correctively tempered with intake air density according to the temperature of intake air Tha and the atmospheric pressure Atp at step S2 and a target engine output torque Trqob based on the engine speed Ne and an accelerator position Acc at step S3, a judgement is made at step S4 as to whether the engine operates in the stratified charge combustion zone Z1. When the engine operates in the stratified charge combustion zone Z1, after determining a basic throttle valve opening Tvob and an amount of off-EGR air charge Ceob both based on the engine speed Ne and the target engine output torque Trqob at steps S5 and S6, respectively, an amount of air charge Ceest is estimated by calculating a function f2 of engine speed Ne and throttle valve opening Tvo correctively tempered with intake air density according to the temperature of intake air Tha and the atmospheric pressure Atp at step S7. Further, a feedback correction throttle valve opening Tvofb is determined by, for example, P-ID control by calculating a function f3 of the target amount of air charge Ceob and estimated amount of air charge Ceest at step S8. Subsequently, at step S9, a target throttle valve opening Tvoob is determined by calculating the following expression:

$$Tvoob = Tvob \times (1 + Tvofb)$$

Thereafter, a judgement is made at step S10 as to whether the condition for execution of the exhaust gas recirculation control which includes a specified temperature of engine cooling water is satisfied. When the EGR condition is satisfied, after determining a basic EGR valve opening Pegrb and a target amount of on-EGR air charge Ceob both based on the engine speed Ne and the target engine output torque Trqob at steps S11 and S12, respectively, a feedback correction EGR valve opening Pegrfb is determined by, for example, PID control by calculating a function f4 of the amount of air charge Ce and the target amount of on-EGR air charge Ceob at step S13. Subsequently, at step S14, a target EGR valve opening Pegrob is determined by calculating the following expression:

$$Pegrob = Pegrb + Pegrfb$$

Finally, at step S15, the EGR valve 36 is feedback controlled based on the target EGR valve opening Pegrob and current EGR valve opening Pegr. Specifically, control duty signals Tegrv and Tegra, which are obtained as functions f5 and f6 of target EGR valve opening Pegrob and current EGR valve opening Pegr, are provided for the vacuum induction duty solenoid valve and the atmosphere induction solenoid valve of the vacuum regulator 38, respectively.

With the air intake control system in accordance with an embodiment of the invention, in the stratified charge combustion zone Z 1, while the throttle valve 28 holds a relatively large opening, fuel is sprayed into the combustion chamber 15 in a later stage of a compression stroke with an effect of uneven distribution of a stratified air-fuel mixture at a proper air-fuel ratio around the spark plug 20. As a result, the air-fuel mixture is significantly diluted in the entire combustion chamber with ensured combustibility, which is always desirable for fuel economy. Furthermore, a large amount of exhaust gas may be admitted to the engine 1 in the stratified charge combustion zone Z1, as a result of which a significant reduction in NOx emissions is yielded.

In the event where the engine encounters a change in engine operating condition or in target engine output torque while operating in the stratified charge combustion zone Z1, the parameters such as an amount of air charge, a throttle valve opening Tvo and an EGR valve opening Pegr vary as shown in FIG. 5C–5F. As shown, when a rise in cooling water temperature Tha, which is one of changes in engine operating condition, occurs, while there occurs a tendency toward a decline in the estimated amount of off-EGR air charge Ceest with respect to a target amount of air charge Ceob due to a drop in intake air density, the tendency is rectified by incorporating a feedback correction of throttle valve opening Tvofb meeting the drop in intake air density. A tendency for the amount of on-EGR air charge to decline due to the drop in intake air density is rectified by incorporating a feedback correction of throttle valve opening Tvofb and, consequently, an EGR valve opening Pegr controlled based on a difference between a target amount of air charge Ceob and an amount of on-EGR air charge Ce is kept at an approximately fixed point. While, in the prior art intake air control, a tendency for air charge to decline due to a drop in intake air density is accompanied by a reduction in exhaust gas admitted to the engine as a result of execution of the exhaust gas recirculation in response to the decline in air charge, however, the intake air control system of the invention incorporates the feedback correction of throttle valve opening with which the tendency to decline in air charge due to a drop in intake air density is rectified and both amounts of air charge and exhaust gas recirculation are desirably regulated, consequently. In particular, in the stratified charge combustion zone Z1, while a large amount of exhaust gas is admitted to the engine 1, the throttle valve 28 remains opened to a relatively large opening and holds a relatively low vacuum in the intake passage, there occur fluctuations in the amount of exhaust gas admitted to the engine 1 due to changes in intake air density. Nevertheless, since the intake air control system of the invention controls the throttle valve to vary its opening according to changes in intake air density before execution of the exhaust gas recirculation control according to amounts of air charge, the exhaust gas recirculation control is performed with higher precision. Furthermore, while the basic throttle valve opening Tvob is set as relatively large as possible but at a point less than a full opening, the amounts of exhaust gas recirculation and air charge are controlled by varying the basic EGR valve opening Pegrb and the basic throttle valve opening Tvob in response to an occurrence of a change in target engine output torque Trqob. That is, when the target engine output torque Trqob is risen, while the basic EGR valve opening Pegrb is increased to increase the amount of exhaust gas recirculation so as thereby to restrain an increase in NOx emissions, the basic throttle valve opening Tvob is increased by a value meeting the increased amount of exhaust gas recirculation and the target amount of off-EGR air charge Ceob is increased correspondingly to the increase in basic throttle valve opening Tvob. The target EGR valve opening Pegrob and the target throttle valve opening Tvoob are feedback control to vary following changes in basic EGR valve opening Pegrb and basic throttle valve opening Tvob. Consequently, when the amount of exhaust gas recirculation is increased as the EGR valve opening Pegr increases, the throttle valve opening Tvo is increased by the increased exhaust gas recirculation, as a result of which, a proper amount of air charge is fixedly provided.

As described above, since, while the intake air control system makes both basic EGR valve opening Pegrb and basic throttle valve opening Tvob larger in the stratified charge combustion zone Z1, the basic throttle valve opening Tvob is limited to a point less than fill position, it is possible to correct a throttle valve opening Tvo toward larger positions upon an occurrence of a drop in intake air density.

The basic throttle valve opening Tvob may be previously determined so that a correction of throttle valve opening brings the throttle valve 28 into full position upon an occurrence of a decrease in intake air density in the stratified charge combustion zone Z1. The motor driven throttle valve 28 as variable air charging means may be substituted by, for example, an idle speed control valve disposed in a passage bypassing the throttle valve 28. Assuming that a certain amount of exhaust gas is admitted in the state wherein the exhaust gas recirculation control according to amounts of air charge is interrupted, an amount of air charge and a target amount of air charge in the state may be obtained in place of the estimated amount of off-EGR air charge Ceest and the target amount of off-EGR air charge Ceob.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An air intake control system for an engine equipped with an exhaust gas recirculation system for performing control of exhaust gas regulating means in which an amount of exhaust gas admitted to the engine is regulated to bring an amount of air charge to the engine dictated by an air flow rate to a target amount of air charge determined according to engine operating conditions, said air intake control system comprising:

variable air intake means disposed in an intake air passage and driven to variably control a practical amount of air charge to the engine; and control means for estimating an amount of air charge to the engine on the basis of a driven amount of said variable air intake means on a condition that said control of exhaust gas regulating means is assumed to be interrupted, and performing control of said variable air intake means to bring said practical amount of air charge to said target amount of air charge.

2. The air intake control system as defined in claim 1, wherein said control means performs control of said amount of air charge by said variable air intake means while said exhaust gas recirculation system performs said control of said exhaust gas regulating means.

3. The air intake control system as defined in claim 1, wherein said engine is of a fuel direct injection type having a fuel injector which is controlled to inject fuel in a compression stroke to create a stratified air-fuel mixture in a specified engine operating zone and said control of exhaust gas recirculation through said exhaust gas regulating means and said control of intake air through said variable air intake means are performed in at least said specified engine operating zone.

4. The air intake control system as defined in claim 1, wherein said variable air intake means comprises an electrically actuated throttle valve.

5. The air intake control system as defined in claim 4, wherein said control means determines a basic throttle valve opening for said electrically actuated throttle valve according to engine operating conditions and corrects a throttle valve opening for said electrically actuated throttle valve on the basis of said basic throttle valve opening and a difference between said amount of air charge estimated and said target amount of air charge.

6. The air intake control system as defined in claim 5, wherein said control means estimates said amount of air charge on the basis of an engine speed and said throttle valve opening correctively tempered with intake air density according to a temperature of intake air and atmospheric pressure.

7. The air intake control system as defined in claim 6, wherein said basic throttle valve opening and an controlled amount of said exhaust gas regulating means are set so that pressure in said intake air passage downstream from said electrically actuated throttle valve is made approximately equal to the atmospheric pressure in an extent of said basic throttle opening less than said full position in an engine operating zone in which said control of exhaust gas regulating means and said control of said variable air intake means are performed.

8. The air intake control system as defined in claim 6, wherein said throttle valve opening is set to a full position only when intake air density is low in an engine operating zone in which said control of exhaust gas regulating means and said control of said variable air intake means are performed and said basic throttle valve opening is set to be large.

* * * * *